United States Patent
Yoshida et al.

(10) Patent No.: US 10,843,537 B2
(45) Date of Patent: Nov. 24, 2020

(54) DOOR BEAM

(71) Applicant: Kobe Steel, Ltd., Kobe (JP)

(72) Inventors: Masatoshi Yoshida, Kobe (JP); Takahiro Shikama, Shimonoseki (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 16/561,659

(22) Filed: Sep. 5, 2019

(65) Prior Publication Data

US 2019/0389286 A1    Dec. 26, 2019

Related U.S. Application Data

(62) Division of application No. 16/198,941, filed on Nov. 23, 2018.

(30) Foreign Application Priority Data

Nov. 22, 2017  (JP) .................. 2017-225001

(51) Int. Cl.
*B60J 5/04* (2006.01)
*B21C 23/14* (2006.01)
*C22C 21/10* (2006.01)

(52) U.S. Cl.
CPC ........... *B60J 5/0444* (2013.01); *B21C 23/142* (2013.01); *B60J 5/0443* (2013.01); *B60J 5/0483* (2013.01); *C22C 21/10* (2013.01)

(58) Field of Classification Search
CPC ....... B62D 21/02; B60J 5/0444; B60J 5/0483; B60J 5/0447; B60J 5/0443; B60J 5/0452; C22C 21/10; B21C 23/002
See application file for complete search history.

(56) References Cited

U.S. PATENT DOCUMENTS

| 2,508,032 | A | | 5/1950 | Kennedy |
| 2,626,024 | A | | 1/1953 | Persson |
| 2,718,289 | A | | 9/1955 | Collins |
| 2,728,587 | A | * | 12/1955 | McKinley ............ B62D 21/02 280/797 |
| 2,734,117 | A | | 2/1956 | Randall |
| 2,975,874 | A | | 3/1961 | Pagan |

(Continued)

FOREIGN PATENT DOCUMENTS

| JP | 61-266123 A | 11/1986 |
| JP | 10-306338 A | 11/1998 |

(Continued)

OTHER PUBLICATIONS

JP2015/147490 Machine Translation (Year: 2015).*
Extended European Search Report dated Apr. 25, 2019, in European Patent Application No. 18206095.4 filed Nov. 14, 2018.

*Primary Examiner* — Lee A Holly
(74) *Attorney, Agent, or Firm* — Oblon, McClelland, Maier & Neustadt, L.L.P.

(57) ABSTRACT

A door beam includes an aluminum alloy extrusion body extended in a longitudinal direction and having a pair of webs and a pair of flanges to be positioned on an inner side and an outer side in a width direction of a vehicle body. The pair of webs connect the pair of flanges at joint portions of each of the pair of webs such that the pair of webs and the pair of flanges form a closed cross section in a direction perpendicular to the longitudinal direction, and the pair of webs do not have a welded portion.

8 Claims, 4 Drawing Sheets

(56) References Cited

U.S. PATENT DOCUMENTS

| | | |
|---|---|---|
| 4,002,000 A | 1/1977 | Howard et al. |
| 4,760,682 A | 8/1988 | King |
| 5,205,098 A | 4/1993 | Landis et al. |
| 5,442,885 A | 8/1995 | Laven et al. |
| 5,464,302 A | 11/1995 | Menchetti |
| 5,507,522 A | 4/1996 | Ritchie |
| 5,881,508 A | 3/1999 | Irvine et al. |
| 7,107,730 B2 | 9/2006 | Park |
| 7,178,304 B2 | 2/2007 | Brady |
| 7,861,489 B2 | 1/2011 | Ueno et al. |
| D721,826 S | 1/2015 | Ryan |
| D742,549 S | 11/2015 | Ryan |
| 9,180,759 B2 | 11/2015 | Schleichert et al. |
| 9,783,244 B2 | 10/2017 | Shi et al. |
| 2001/0004825 A1 | 6/2001 | Menendez |
| 2002/0005022 A1 | 1/2002 | Matthews |
| 2003/0126827 A1 | 7/2003 | Davis |
| 2004/0093825 A1 | 5/2004 | Lee |
| 2004/0255543 A1 | 12/2004 | Ubilla |
| 2005/0073170 A1 | 4/2005 | Sakamoto et al. |
| 2005/0097855 A1 | 5/2005 | Fouad et al. |
| 2005/0279049 A1 | 12/2005 | MacKenzie et al. |
| 2006/0005503 A1 | 1/2006 | Bladow et al. |
| 2007/0074480 A1 | 4/2007 | Kleila et al. |
| 2007/0107368 A1 | 5/2007 | Ruehl |
| 2007/0113506 A1 | 5/2007 | Denadel |
| 2008/0028721 A1 | 2/2008 | Daniels |
| 2011/0036050 A1 | 2/2011 | Callahan |
| 2011/0036051 A1 | 2/2011 | Callahan |
| 2011/0041582 A1* | 2/2011 | Kim ............... B21C 23/002 72/253.1 |
| 2011/0232227 A1 | 9/2011 | Crow et al. |
| 2013/0017406 A1 | 1/2013 | Kinefuchi et al. |
| 2016/0333445 A1 | 11/2016 | Miyata et al. |
| 2017/0051507 A1 | 2/2017 | Groppe et al. |
| 2018/0236851 A1 | 8/2018 | Shimoaka et al. |

FOREIGN PATENT DOCUMENTS

| | | |
|---|---|---|
| JP | 2003-154407 A | 5/2003 |
| JP | 2006-233336 A | 9/2006 |
| JP | 2007-231408 A | 9/2007 |
| JP | 2009-045672 A | 3/2009 |
| JP | 2015147490 A * | 8/2015 |

* cited by examiner

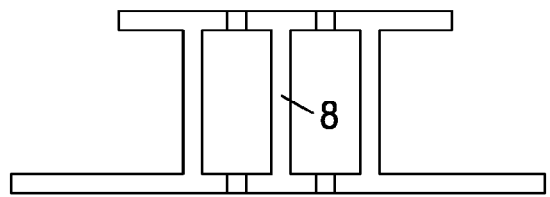
F I G . 5
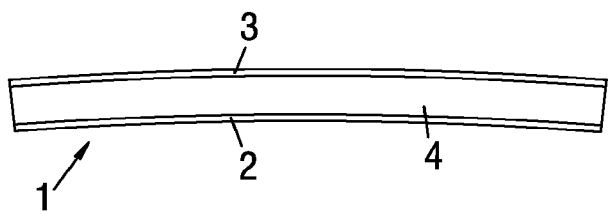
F I G . 6
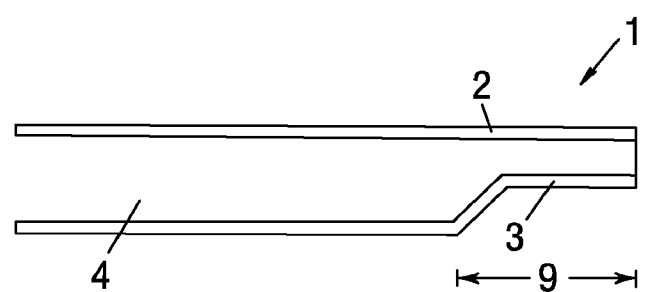
F I G . 7

DOOR BEAM

CROSS-REFERENCE TO RELATED APPLICATIONS

This application is a divisional of U.S. application Ser. No. 16/198,941, filed Nov. 23, 2018, which is based on and claims the benefits of priority to Japanese Patent Application No. 2017-225001, filed Nov. 22, 2017. The entire contents of all of the above applications are incorporated herein by reference.

BACKGROUND OF THE INVENTION

Field of Invention

The present invention relates to a door beam for an automobile formed of an aluminum alloy extrusion of a closed cross-section structure.

Discussion of the Background

A door beam formed of an aluminum alloy extrusion generally includes a pair of flanges (an outer flange positioned on the outer side in the vehicle body width direction and an inner flange positioned on the inner side in the vehicle body width direction) and a pair of webs connecting the pair of flanges with each other (refer to JP-A No. 2006-233336). The door beam has a closed cross-section structure that is formed by these pairs of the flanges and the webs.

The aluminum alloy extrusion of such a closed cross-section structure is manufactured using a hollow die such as a porthole die, a bridge die, and a spider die. For example, in the extrusion method using a porthole die, a porthole the combining a mandrel body and a die is used, the mandrel body including plural portholes. An aluminum billet pressed into the porthole die is divided by the portholes, thereafter surrounds the mandrel to be welded and integrated again, and becomes an extrusion of a closed cross-section structure with the inner surface being formed by the mandrel and with the outer surface being formed by the die. Thus, in the aluminum alloy extrusion of the closed cross-section structure manufactured using the hollow die, a welded portion exists inevitably.

With respect to the aluminum alloy extrusion having the welded portion, the structure is different between the welded portion and the portions other than the welded portion (normal portion), and such a fact becomes a problem that the mechanical property for example the rupture limit of the welded portion is lower compared to the normal portion. In the door beam formed of an aluminum alloy extrusion, low rupture limit of the welded portion possibly causes drop of the strength and the energy absorption amount of the door beam as an energy absorption member.

On the other hand, with respect to an aluminum alloy extrusion of a closed cross-section structure having a welded portion, improvement of the mechanical property of the welded portion by improving the material composition and the manufacturing condition has been studied as described for example in JP-A No. Heisei 10-306338, JP-A No. 2003-154407, JP-A No. 2007-231408, and JP-A No. 2009-045672.

SUMMARY OF INVENTION

According to an aspect of the present invention, a door beam includes an aluminum alloy extrusion body extended in a longitudinal direction and having a pair of webs and a pair of flanges to be positioned on an inner side and an outer side in a width direction of a vehicle body. The pair of webs connect the pair of flanges at joint portions of each of the pair of webs such that the pair of webs and the pair of flanges form a closed cross section in a direction perpendicular to the longitudinal direction, and the pair of webs do not have a welded portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a cross section of a door beam according to still another embodiment of the present invention;

FIG. 6 is a plan view of a door beam according to yet another embodiment of the present invention along the longitudinal direction which is curved in a convex form toward the outer side in a width direction of a vehicle body; and FIG. 7 is a plan view of a door beam which is press-formed according to an embodiment of the present invention.

DESCRIPTION OF THE EMBODIMENTS

Figure 1A:
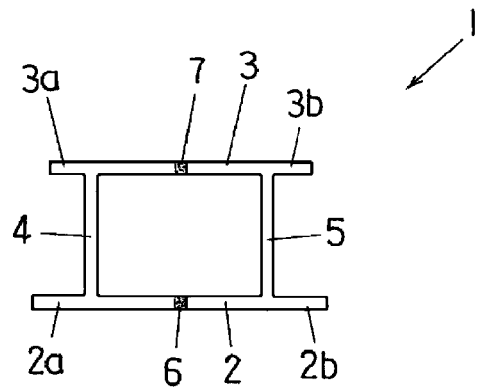
FIG. 1A is a cross section of a door beam according to an embodiment of the present invention.

The embodiments will now be described with reference to the accompanying drawings, wherein like reference numerals designate corresponding or identical elements throughout the various drawings.

First, a door beam according to an embodiment of the present invention will be explained referring to FIG. 1A and FIG. 1B.

Figure 1B:
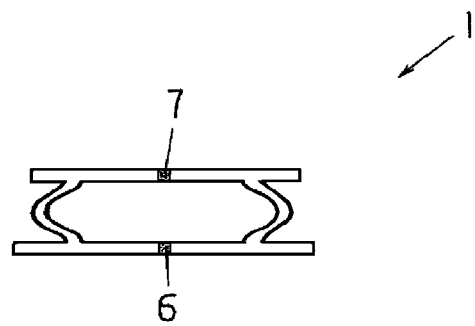
FIG. 1B is a cross section of the door beam which is bent and deformed due to a collision.

A door beam 1 illustrated in FIG. 1A is formed of an aluminum alloy extrusion of a closed cross-section structure having a welded portion along the longitudinal direction (extruding direction). The door beam 1 is straight in the longitudinal direction, and includes a pair of flanges (an inner flange 2, an outer flange 3) positioned on the inner side and the outer side in the vehicle body width direction and a pair of webs 4, 5 connecting the pair of flanges with each other. Each of the inner flange 2 and the outer flange 3 includes portions (protruding flanges 2a, 2b, 3a, 3b) protruding outward from joint sections with a pair of the webs 4, 5. Both of a pair of the flanges 2, 3 and a pair of the webs 4, 5 have a flat plate shape, and are formed to be substantially orthogonal to each other.

Also, one or more intermediate ribs 8 may be arranged between a pair of the webs 4, 5 as shown in FIG. 5. Further, in the door beam 1 illustrated in FIG. 1A, the protruding flanges 2a, 2b, 3a, 3b are arranged at both ends of a pair of the flanges 2, 3 respectively, however, this point is not indispensable, and the door beam 1 may has such a cross-sectional shape that the protrusion flange is not arranged in one or both of the flanges.

In this door beam 1, welded portions 6, 7 are formed in a pair of the flanges 2, 3. The welded portions 6, 7 are formed along the longitudinal direction of the door beam 1 (the extruding direction of the aluminum alloy extrusion).

The position of the welded portions 6, 7 in the width direction of a pair of the flanges 2, 3 is not particularly limited. However, from a viewpoint of preventing the welded portions 6, 7 from becoming a point of origin of occurrence of breakage at the time of a collision, it is preferable that the position of the welded portions 6, 7 is between the web 4 and the web 5 avoiding the joint portion of the flanges 2, 3 and the webs 4, 5, and the center portion of the web 4 and the web 5 (such a position that the distance from the web 4 is substantially the same as the distance from the web 5) as illustrated in FIG. 1A is more preferable. When the intermediate rib 8 is arranged, in a similar manner, it is preferable that the position of the welded portion is between the web 4 and the web 5 (between the web 4 and the intermediate rib 8 and/or between the web 5 and the intermediate rib 8) avoiding the joint portion of the intermediate rib 8 and the flanges 2, 3.

The aluminum alloy extrusion of a closed cross-section structure which is a raw material of the door beam 1 is manufactured using a hollow die such as a porthole die, a bridge die, and a spider die. The welded portions 6, 7 described above are formed by that the metal flow is once divided inside the hollow die and are integrated thereafter, exist along the longitudinal direction (the extruding direction) of the aluminum alloy extrusion, and have a microstructure different from that of a portion (the normal portion) other than the welded portion.

Figure 2A:
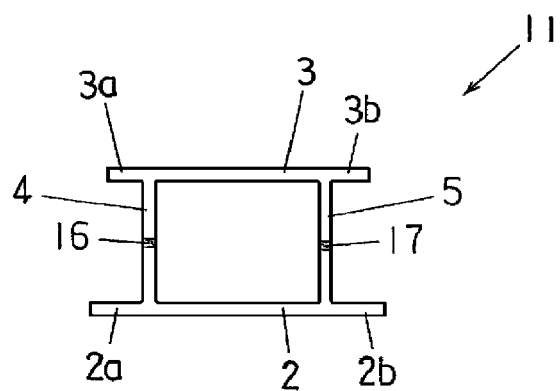
FIG. 2A is a cross section of a door beam according to another embodiment.

FIG. 2A illustrates a cross-sectional view of a door beam 11 (conventional material) having a form different from that of the door beam 1 (FIG. 1A) related to the present disclosure. In the door beam 11 of FIG. 2A, portions substantially the same as those of the door beam 1 of FIG. 1A are marked with the same reference signs.

The door beam 11 is formed of an aluminum alloy extrusion of a closed cross-section structure having a welded portion along the longitudinal direction (extruding direction), and has a closed cross-section structure substantially the same as that of the door beam 1.

However, in this door beam 11, welded portions 16, 17 are formed in a pair of the webs 4, 5 differently from the door beam 1. The welded portions 16, 17 are formed along the longitudinal direction of the door beam 1 (the extruding direction of the aluminum alloy extrusion) similarly to the welded portions 6, 7 of the door beam 1.

Figure 3A:
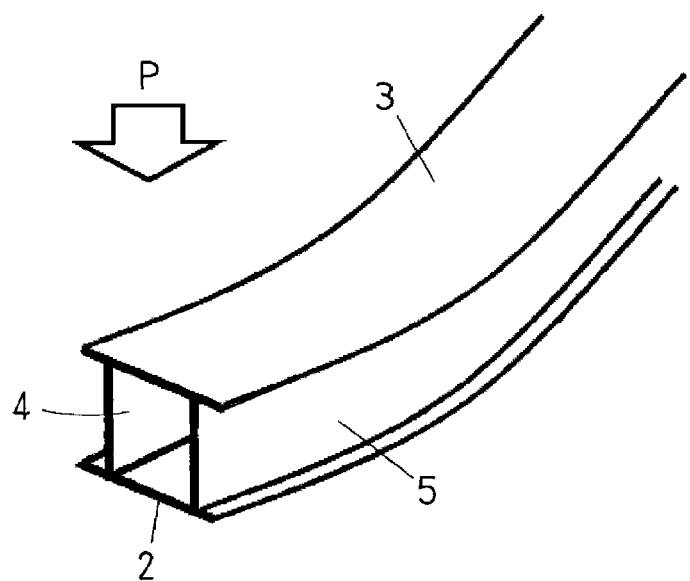
FIG. 3A illustrates a shape of a door beam in the stage of the first half of a collision.
Figure 3B:
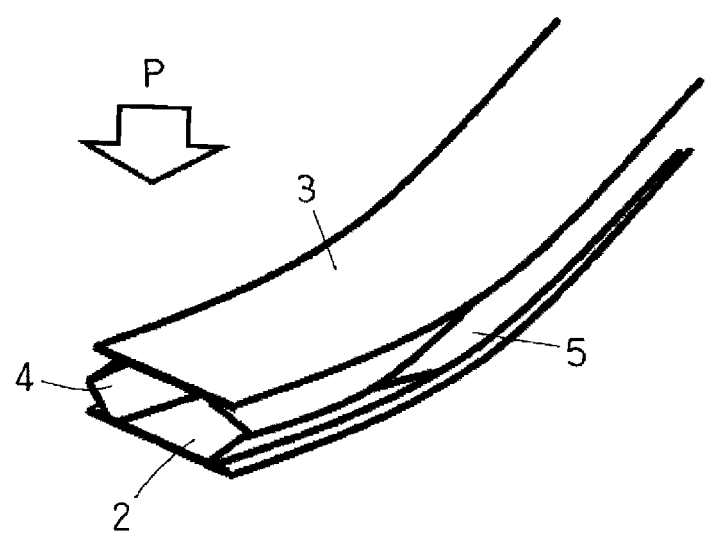
FIG. 3B illustrates a shape of the door beam in the stage of the latter half of the collision.

When a collision load P is applied to the door beam 1, 11, in the door beam 1, 11, a bending deformation around a rotation axis of the vehicle body vertical direction occurs, at the stage of the first half of a collision (refer to FIG. 3A), a tensile strain is generated in the inner flange 2 and a compressive strain is generated in the outer flange 3. Subsequently, in the stage of the latter half of the collision (refer to FIG. 3A), the webs 4, 5 buckle and are bendingly deformed around the middle region in the vehicle width direction.

Since the door beam receives the collision load, it is required to increase the energy absorption amount. In order to secure a high energy absorption amount, it is required to make the web buckle so that the flange on the inner side in the vehicle width direction (the back side of the collision) is not broken and to relax the tensile strain generated in the flange on the inner side in the vehicle width direction particularly in the stage of the latter half of the collision. When the web buckles, the web is bendingly deformed around its middle region in the vehicle width direction, and the strain is concentrated locally to this region. Also, when the welded portion where the rupture limit is low is arranged in the web, such problem possibly occurs that, in the stage of the latter half of the collision, the web bucklingly deforms promptly originated from the welded portion or the welded portion is liable to be easily broken, and that the energy absorption performance from then onward deteriorates.

Figure 2B:
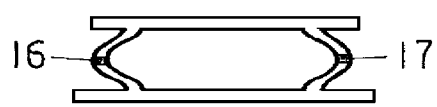
FIG. 2B is a cross section of the door beam which is bent and deformed due to a collision.

In the case of the door beam 11, the welded portions 16, 17 are formed in a pair of the webs 4, 5 to which the strain is liable to concentrate. Therefore, in the stage of the latter half of the collision (refer to FIG. 2B), a pair of the webs 4, 5 bucklingly deforms in the early stage, which is originated from the welded portions 16, 17, or the webs 4, 5 are liable to be easily broken in the welded portions 16, 17, and the energy absorption performance from then onward deteriorates.

On the other hand, in the case of the door beam 1, the welded portions 6, 7 are not formed in a pair of the webs 4, 5. Therefore, in the stage of the latter half of a collision (refer to FIG. 1B), such an event is avoided that the welded portions 6, 7 become a point of origin of the buckling deformation of a pair of the webs 4, 5, rupture of a pair of the webs 4, 5 comes to hardly occur, and thereby deterioration of the energy absorption performance can be prevented.

In the door beam 1, since the welded portions 6, 7 are formed in the flange section, in the bending deformation of a pair of the flanges 2, 3 around the rotation axis of the vehicle body vertical direction in the first half of a collision, a high strain occurs also in the welded portions 6, 7. However, unlike the bending deformation caused by buckling of a pair of the webs 4, 5, this bending deformation is such a deformation type that a tensile or compressive load is received by the whole of a pair of the flanges 2, 3 in the longitudinal direction, and the occupying rate of the welded portions 6, 7 in the whole of a pair of the flanges 2, 3 is comparatively small. Therefore, drop of the strength of the flanges 2, 3 attributable to the welded portions 6, 7 is negligibly small, deformation of the welded portions 6, 7 is suppressed by the material (the normal portion) around the welded portions 6, 7, and the rupture of the welded portions 6, 7 hardly occurs.

As another embodiment of the door beam related to the present invention, a door beam may be subjected to bend forming (so-called large radius bending) in the longitudinal direction, and may thereby have a shape of being curved so as to be convex to the outer side in the vehicle body width direction (refer to FIG. 6 of this application and FIG. 5(b) of JP-A No. 2015-147490 for example). The cross-section structure illustrated in FIG. 1A and FIG. 1B is suitable to be applied to a door beam that is subjected to such bend forming.

Figure 4:
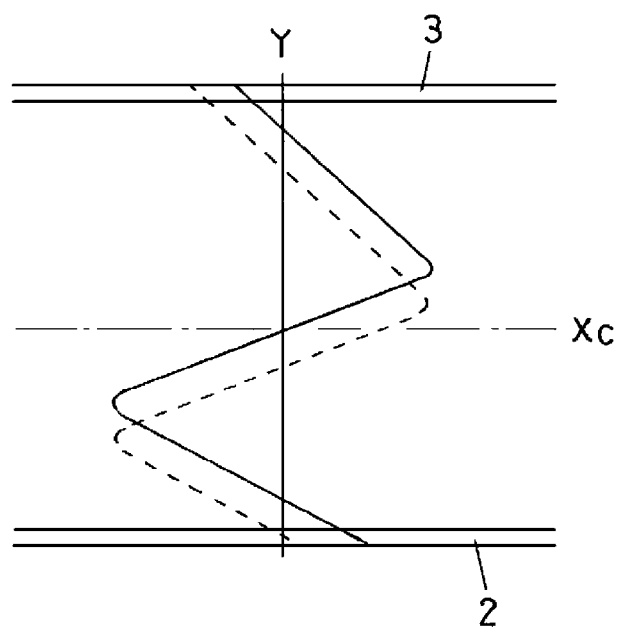
FIG. 4 is a schematic drawing that illustrates the residual stress distribution in a cross section of the door beam bent to have a large radius.

When the bending work is simple bending (the bending work without applying a tensile force in the longitudinal direction) and the door beam has a shape of being curved so as to be convex to the outer side in the vehicle body width direction, the residual stress distribution within the door beam generally becomes such a one as illustrates by the solid line in FIG. 4. Here, Xc is the neutral axis of bending, the right side of the axis Y is for the tensile stress, and the left side is for the compressive stress. The residual tensile stress becomes the maximum at a position slightly closer to the outer flange 3 from the neutral axis Xc. When bend forming is tensile bending, the residual stress distribution within the door beam generally becomes such a one as illustrated by the broken line in FIG. 4. Since the neutral axis Xc of bending moves to the inner flange 2 side by a tensile force, the residual tensile stress becomes the maximum at a position closer to the inner flange 2 side compared to the case of the simple bending. In any event, within the door beam having been subjected to bend forming, a large tensile stress remains in a generally center region in the vehicle width direction of the webs 4, 5.

In an aluminum alloy extrusion of a closed cross-section structure, the welded portion is more liable to cause stress corrosion cracking compared to a portion other than the welded portion (the normal portion). When such welded portion exists in the substantially center region in the vehicle width direction described above of the webs 4, 5 where a large tensile stress remains, the stress corrosion cracking is liable to occur in the region. On the other hand, in the door beam according to the above embodiment of the present invention, the welded portions 6, 7 (refer to FIG. 1A) where the stress corrosion cracking is liable to occur are not formed in the webs 4, 5 where a high tensile stress remains by bend forming. Accordingly, the stress corrosion cracking is less likely to occur in the webs 4, 5 compared to the door beam where the welded portions 16, 17 (refer to FIG. 2A) are formed in the webs 4, 5, and therefore it is also possible to perform tougher bend forming.

As still another embodiment of the present invention, a door beam may be subjected to a pressing work (crushing work) at least in a portion of the longitudinal direction, and may thereby include a crushing work section where the gap between a pair of the flanges becomes narrow in a portion of the longitudinal direction as shown in FIG. 7. FIG. 7 shows an example where crushing (or press-forming) is applied on the flange 3 in a direction toward the flange 2, but the flange 2 may receive such crushing in a direction toward the flange 3. The cross-section structure illustrated in FIG. 1A and FIG. 1B is suitable to be applied to a door beam that is subjected to such bend forming.

In a position having received the crushing work (the crushing work section), a pair of the webs 4, 5 bendingly deform, and the gap between a pair of the flanges 2, 3 becomes narrow. When the crushing work is performed, a high tensile stress remains in the boundary region of the crushing work section and the non-crushing work section of a pair of the webs 4, 5 (refer to JP-A No. 2014-145119). However, in the door beam according to the above embodiment of the present invention, the welded portions 6, 7 (refer to FIG. 1A) are not formed in a pair of the webs 4, 5. Therefore the stress corrosion cracking is less likely to occur in the webs 4, 5 compared to the door beam (refer to FIG. 2A) where the welded portions 16, 17 are formed in a pair of the webs 4, 5, and therefore it is also possible to perform a tougher crushing work. There is also an advantage of improvement of the rupture limit at the time of the crushing work because the welded portions 6, 7 are not formed in a pair of the webs 4, 5.

In order to secure a high strength in the bending deformation around the rotation axis of the vehicle body vertical direction of the stage of the first half of a collision in the door beam according to the above embodiment (refer to FIG. 1A) of the present invention, it is more effective to increase the thickness of a pair of the flanges 2, 3 positioned farther from the neutral axis than a pair of the webs 4, 5 that are near to the neutral axis. On the other hand, in the case of extrusion using a hollow die, when the thickness difference between two sides (the flange and the web) connected to each other exceeds three times, the manufacturing defect such as the underfill is liable to occur. Therefore, in the door beam according to the above embodiment of the present invention, it is preferable to set the thickness of the flanges 2, 3 to two to three times of the thickness of the webs 4, 5.

Although the aluminum alloy extrusion that is a raw material of the door beam is not particularly limited, a 7000-series aluminum alloy extrusion having a high strength which is lower in the rupture limit and is liable to cause a problem of the stress corrosion cracking compared to the 6000-series aluminum alloy extrusion can be employed suitably. As the composition of the 7000-series aluminum alloy, the composition specified in JIS or AA Standards can be applied. As a preferable composition, there can be cited a composition including Zn: 3-8 mass %, Mg: 0.4-2.5 mass %, Cu: 0.05 to 2.0 mass %, and Ti: 0.005 to 0.2 mass %, further including one kind or more out of Mn: 0.01 to 0.3 mass %, Cr: 0.01 to 0.3 mass %, and Zr: 0.01 to 0.3 mass % with the remainder including Al and impurities.

As discussed above, improvement of mechanical property of a welded portion has been studied. However, even with an improvement of material composition and manufacturing condition, it is hard to equalize the mechanical property of the welded portion and the normal portion of the aluminum alloy extrusion.

An aspect of the present invention is to provide a door beam formed of an aluminum alloy extrusion of a closed cross-section structure having a welded portion, which is not likely to get ruptured at the time of collision.

A door beam according to an embodiment of the present invention is formed of an aluminum alloy extrusion of a closed cross-section structure having a welded portion along the longitudinal direction (extruding direction) and includes a pair of flanges positioned on the inner side and the outer side in the vehicle body width direction and a pair of webs connecting the pair of flanges with each other, and the welded portion is arranged in the pair of flanges and is not arranged in the webs.

In a door beam according to an embodiment of the present invention, by arranging the welded portion in the pair of flanges and not arranging the welded portion in the pair of the webs, such an event can be avoided that the welded portion becomes a point of origin of deformation in the buckling deformation of the web at the time of a collision, and thereby rupture of the webs comes to be not likely to occur at the time of a collision.

Obviously, numerous modifications and variations of the present invention are possible in light of the above teachings. It is therefore to be understood that within the scope of the appended claims, the invention may be practiced otherwise than as specifically described herein.

What is claimed is:

1. A method of producing a door beam, comprising:
   pressing an aluminum billet into a hollow die such that pressed aluminum billet is divided by the hollow die; and
   welding divided aluminum billets to one another such that an aluminum alloy extrusion body is formed and extended in a longitudinal direction,
   wherein the welding forms a pair of flanges in the aluminum alloy extrusion body such that is weld occurs along the longitudinal edge of the divided aluminum billets the welding does not form a welded portion in a pair of webs in the aluminum alloy extrusion body, the pair of webs and the pair of flanges are to be positioned on an inner side and an outer side in a width direction of a vehicle body, and the pair of webs connect the pair of flanges at joint portions of each of the pair of webs such that the pair of webs and the pair of flanges form a closed cross section in a direction perpendicular to the longitudinal direction.

2. The method of claim 1, wherein the aluminum alloy extrusion body comprises an aluminum alloy including Al, 3-8 mass % of Zn, 0.4-2.5 mass % of Mg, 0.05 to 2.0 mass % of Cu, and 0.005 to 0.2 mass % of Ti, and further including at least one of 0.01 to 0.3 mass % of Mn, 0.01 to 0.3 mass % of Cr, and 0.01 to 0.3 mass % of Zr.

3. The method of claim 2, further comprising:
applying press-forming on an end portion in the longitudinal direction such that a distance between the pair of the flanges is narrowed.

4. The method of claim 3, wherein the aluminum alloy extrusion body is formed such that the aluminum alloy extrusion body is extended in the longitudinal direction and has a same closed cross section in the direction perpendicular to the longitudinal direction, except for the end portion where the press-forming is applied.

5. The method of claim 2, further comprising:
bend forming the aluminum alloy extrusion body along the longitudinal direction such that the aluminum alloy extrusion body is curved in a convex form toward an outer side in a width direction of a vehicle body.

6. The method of claim 1, further comprising:
applying press-forming on an end portion in the longitudinal direction such that a distance between the pair of the flanges is narrowed.

7. The method of claim 6, wherein the aluminum alloy extrusion body is formed such that the aluminum alloy extrusion body is extended in the longitudinal direction and has a same closed cross section in the direction perpendicular to the longitudinal direction, except for the end portion where the press-forming is applied.

8. The method of claim 1, further comprising:
bend forming the aluminum alloy extrusion body along the longitudinal direction such that the aluminum alloy extrusion body is curved in a convex form toward an outer side in a width direction of a vehicle body.

* * * * *